United States Patent [19]

Nickerson et al.

[11] 3,766,685

[45] Oct. 23, 1973

[54] SOIL CONDITIONER

[75] Inventors: Walter J. Nickerson, Middlesex; Marcel D. Faber, New Brunswick, both of N.J.

[73] Assignee: The Firestone Tire & Rubber Co., Akron, Ohio

[22] Filed: May 10, 1972

[21] Appl. No.: 251,908

[52] U.S. Cl.................. 47/37, 195/1, 47/DIG. 10, 111/1, 47/58, 47/57.6, 71/64 SC
[51] Int. Cl............................................. A01g 9/10
[58] Field of Search ................... 111/1; 47/37, 58, 47/DIG. 10, 57.6; 195/1; 71/64

[56] References Cited
UNITED STATES PATENTS

| | | | |
|---|---|---|---|
| 2,625,471 | 1/1953 | Mowry et al.................. | 47/DIG. 10 |
| 2,703,276 | 3/1955 | Hedrick et al........................ | 47/1 X |
| 2,754,623 | 7/1956 | Mowry et al.............................. | 47/1 |
| 2,848,840 | 8/1958 | O'Brien et al. ........................... | 47/1 |
| 2,961,799 | 11/1960 | Coe.......................................... | 47/9 |
| 3,316,676 | 5/1967 | Legal et al.............................. | 47/58 |

FOREIGN PATENTS OR APPLICATIONS 212,372  12/1955  Australia

*Primary Examiner*—Robert E. Bagwill
*Attorney*—Henry T. Burke et al.

[57] ABSTRACT

Soil conditioner is produced by fermentation of used tire mesh to produce an oxygen enriched product integrally bonded to the mycelium produced by the fermentation organism.

12 Claims, No Drawings

SOIL CONDITIONER

BACKGROUND OF INVENTION

Many millions of acres of potentially arable land throughout the world are not so employed because the land cannot efficiently utilize the water which is available either as precipitation or by irrigation. Often the soil has such carcasses, high clay content that the water cannot be absorbed and it runs off. In other areas the land has such a high sand content that the water immediately sinks into the ground to a depth where it is not available to support vegetation. Huge areas of the world such as parts of North Africa and the Middle East which once supported agriculture are no longer able to do so because poor farming practices have laid waste to the land.

These millions of acres could be turned into useful farm land, and the wasted areas could be reclaimed if they could be made efficiently to utilize available water so as to support vegetation and eventually build up an enriched top soil.

One of the truly serious problems of modern society is the disposal of tire wastes. Old tires cannot be efficiently burned, buried or regenerated. Destructive distillation has been used to some extent to dispose of used tire caracasses, but this procedure is costly, and may be a source of atmospheric pollution. As a result many millions of old, used tires accumulate in unsightly dumps in the areas surrounding our cities.

A method has now been discovered to mitigate both problems; the problem of unused land and the problem of accumulated used tire carcasses.

THE INVENTION

This invention specifically relates to soil conditioners produced by fermentation of microorganisms using tire mesh as a substrate. The novel products of the invention are soil conditioners comprising oxygen enriched particulate fermentation products of used tire mesh integrally bonded to the mycelium produced by the fermentation organism. They can be suspended in water, and when dispersed in sandy or clayey soil will markedly increase the capacity of the soil to retain water. Because of the presence of the organic mycelium the products themselves are useful nutrients to support vegetative growth. The products also have ion exchange capacity and therefore can be used to enrich the soil with metallic nutrients.

While the invention is particularly applicable to, and of great economic and ecological value with used tires, it is of course analogously useful with other equivalent rubber sources.

Used tires as a raw materials source comprise a heterogenous mix of natural and synthetic rubbers containing a wide variety of adjuvants. Normally tires contain both natural and synthetic rubbers, the relative proportions of each depending upon the type of tire. Truck and other heavy duty tires contain a high proportion of natural rubbers. Synthetic rubbers employed in tire production include for example, butadiene-styrene rubbers, butadiene-acrylonitrile rubbers, butyl rubbers prepared from isobutylene, neoprene rubbers prepared from chloroprene, chlorosulfonated polyethylenes, polysulfide rubbers prepared by reacting sodium polysulfide with chlorine terminated aliphatic hydrocarbons or ethers, and silicone rubbers which are the polymerication products of dialkyl siloxanes, principally dimethyl siloxane. The process of this invention is applicable to all of these rubber substrates, and to others which are sometimes employed.

In the preparation of tires the rubber will be compounded with a wide variety of other materials. They are vulcanized so, of course, will contain sulfur and vulcanization aids, particularly accelerators. They will also usually contain antioxidants; antiozanants; various resins, especially of the coumarone-indene type; zinc oxide, carbon black and hydrocarbon oils of the naphthenic and aromatic class. Typically truck tires will contain at least 50 percent to 90 percent natural rubber and passenger car tires an average of 75 percent synthetic rubber. The average amount of hydrocarbon oils used in oil extended rubber tires is 40 percent, but it may be as high as 55 percent. Tires may contain from about 40 to 80 parts of carbon black per 100 parts of rubber, 2 to 10 parts per 100 of zinc oxide, 1 to 5 parts per 100 of elemental sulfur, 0.5 to 2 parts per 100 of accelerators and 0.5 to 2 parts per 100 of antioxidants along with other ingredients. Antioxidants which are often employed include phenyl-B-napthylamine, diphenyl-phenylenediamine, dio-toly-ethylenediamine, and N-phenyl-N'-cyclohexyl-p-phenylenediamine. Useful accelerators include 2- mercaptobenzothiazole, n-ter-butyl-2-benzothiazole sulfenamide, tetramethyl-thiuran disulfide, and the zinc salt of 2-mercaptobenzothiazole. Different parts of the tires, for example the treads, side walls and inner linings may contain differing quantities of natural and synthetic rubbers as well as diverse adjuvants in varying amounts. Moreover, different manufacturers may employ different rubbers and different compounding agents. It will be appreciated therefore that "used tires" as a raw material source represents an exceedingly complex mixture. It is a particular advantage of this invention that it is able to utilize such a complex source.

The actual substrate used in the practice of this invention is a used tire mesh. It is prepared in a known manner from used tire carcasses. Usually any metal components of the tires, such as the metal bead are removed, and the remainder is then ground to a grain size of about 1 inch. The particles are heated in boiling, saturated calcium chloride to remove the fiber content; for example, rayon, polyester or nylon threads, and the resulting product recovered, dried and ground to about 35 mesh. This particulate product will be referred to herein as "used tire mesh." It should be understood however that the term is not intended to be limiting, but only a convenient term to include starting materials which are principally obtained from used tires but may also be obtained from equivalent sources such as inner tubes and rubber belts.

A wide variety of microorganisms may be used in the process of this invention. Naturally they will be selected for lack of pathogenicity to plants or animals, including humans. The most fruitful source of suitable microorganisms are of the class Deuteromycetes of *Fungi imperfecti*, although some useful organisms will be found in the class Phycomycetes and Ascomycetes. Like most fungi the *Fungi imperfecti* are composed of innumerable long, fine filaments of cells called hyphae which together constitute the mycelium. It is a characteristic of the products of this invention that the mycelium is integrally bound to the fermentation product produced from the substrate. While it can be removed in hot, dilute hydrochloric acid solution, it may for ordinary purposes be regarded as irreversibly bound to the fermentation product since it cannot be removed by ordinary means. It is this feature of the products which makes them so valuable.

Microorganisms which are useful in the practice of this invention include, for example: *Fusarium solani, Penicillium ochara, Trichoderma viridae, Penicillium terrestre, Ulocladium botrytis, Ulocladium atrum, Candida utilis, Aspergillus flavus var, columnaris* and a variety of other species of the genus *Mucor* and *Penicillium*.

It appears at this time that the ability of microorganisms to utilize tire mesh as a substrate is a function of species. *Fusarium solani*, for example grow readily on tire mesh, *Fusarium oxysporium* does not. It is therefore not possible to group the organisms taxonomically, although one common characteristic is that the useful species are all aerobic. Useful organisms can, however, be isolated and recognized.

One technique of isolation is a soil baiting technique in which a piece of rubber is buried and the soil around is plated into a petri plate containing a growth medium, including trace metals, tire mesh, and a small amount of ethanol. One suitable medium is the Taber and Vining medium which may be modified by the substitution of 0.01 per cent yeast extract for the vitamin source. The culture is incubated at 27° C. with subsequent isolation of individual colonies after 5 days. The pure cultures are transferred to 250 ml shake flasks containing 50 ml of the same growth medium and allowed to incubate for 5 to 8 days at 27° C. in a rotating shaker. The culture is then checked for mycelial or cellular homogeneity and placed into duplicate slants of the same medium at pH levels of 4 and 7 (adjusted after sterilization). The rapidly growing isolates are useful in this invention. The most useful isolates are those which have the ability to grow on tire mesh from which the oil has been substantially removed by extraction with acetone.

Another, and important distinguishing characteristic of organisms useful in the practice of this invention is that the mycelium they produce is irreversibly bound to the fermentation product, as mentioned above. The mycelium cannot be dislodged by sonication or by blender agitation. It can be removed by in refluxing in 6N hydrochloric acid for about 20 minutes. Several yeasts are capable of growth on tire mesh, but do not produce an integrally bound mycelium.

In addition to the method described above, useful organisms can be identified by bathing chunks of rubber, especially chunks of rubber which have been undisturbed in tire dumps for a long period of time, in a circulating growth medium of the type described above. Samples are periodically removed from the medium and plated as described above.

Once a microorganism has been identified as useful in the process of this invention using the procedures described above it may thereafter by used to produce the products of this invention by aerobic growth in an artificial medium containing a nitrogen source, used tire mesh, ethanol and a source of trace elements. Typically growth will be effected with suitable agitation at a pH of from about 3 to 6. The best growth medium for a particular species can be readily determined by observation. It is best to control the pH by selection of the nitrogen source. Phosphorous, magnesium and potassium appear to be the most important elements for the growth of microorganisms useful in this invention. Table 1 shows the media used with two of the presently preferred microorganisms.

TABLE 1.—MEDIA USED FOR TIRE MESH STUDIES [1]

| Organism(s) | Mineral salts [2] | Grams per liter | | | Nitrogen | |
| --- | --- | --- | --- | --- | --- | --- |
| | | $KH_2PO_4$ | $K_2HPO_4$ | $MgSO_4$ | Source | Amount |
| *Fusarium solani* | Yes | 1.0 | 1.0 | 0.5 | $(NH_4)_2SO_4$ | 2.38 |
| *Candida utilis* [3] | No | 0.5 | None | 0.5 | $NH_4NO_3$ | 2.00 |

[1] All media, unless otherwise indicated, contained 2.0% tire mesh and 0.2% ethanol.
[2] Mineral salts were according to Taber and Vining (1959).
[3] Medium used in a 1,000-liter fermentor. This medium contained 0.4% ethanol.

Ethanol is not absolutely essential as an ingredient of the growth medium. Its role appears to be as a partial extractant for the oil. The optimum concentration of ethanol when employed is from about 0.2 to 0.4 percent based on the total weight. Apparently the organisms function best if they are able to initiate growth on the hydrocarbon oils. This is not a necessary feature of the invention however since useful organisms can grow in the absence of ethanol. The most useful, as stated above are those which are capable of growth on tire mesh from which the oil has been substantially completely extracted with acetone. While ethanol is preferred, other extractants, such as methanol, propanol and butanol, which do not inhibit growth of the organism can be employed. It has been observed that the best nitrogen sources are those which do not also serve as a rich source of carbohydrate. Surfactants may be added to the growth medium to help suspend the tire mesh and thereby enhance the fermentation rate, but it is not necessary to do so. Nonionic, anionic, cationic and amphoteric surfactants may be employed.

The optimum period of fermentation will vary with the selected microorganism and the medium. Normally it is from about 3 to 6 days. It is, however, a self-controlling factor since after a period of time the growth apparently stops. It would appear that as fermentation continues on the tire mesh substrate the relative concentration of the various adjuvants reaches a toxic level which the fermentation organism cannot tolerate.

The fermentation temperature is normally room temperature, i.e., from about 20° C to 35° C.

The fermentation products may be harvested by any convenient method, suitably by filtration, for example, by screening.

The physical changes which take place in the tire mesh substrate can be readily observed. The primary transformation is that it is irreversibly bound to mycelium. Additionally the particle sizes are reduced. The original substrate size is about 35 mesh, the final particle size may be decreased to as low as about 250 to 400 mesh.

Strangely, despite the decreased particle size, and despite the fact that the organism has utilized the tire mesh to sustain growth, there is very little difference in the initial weight of the particles and the weight of the final particles after the mycelium has been removed. In a typical run the loss of weight may vary from about 10 percent to 20 percent. In some cases there is substantially no loss in weight. The reason for this is that as fermentation takes place the lighter carbon and hydrogen atoms of the substrate are replaced with oxygen. The final product, therefore, is oxygen enriched. Table 2 shows a typical analysis of the before and after product of a *Candida utilis* fermentation.

TABLE 2

| Element | Percent Element in Tire Mesh Before | After | Percent Change |
|---|---|---|---|
| C | 84.52 | 77.14 | −8.14 |
| H | 7.09 | 6.52 | −8.04 |
| O | 2.74 | 4.87 | +96.00 |

Broadly speaking, the process of this invention is one in which a used tire mesh substrate is fermented under aerobic conditions at a pH of from about 3 to 6 in a nutrient medium containing a nitrogen source and a source of trace elements utilizing microorganisms which form a mycelium which is integrally bound to the fermentation product from the tire mesh substrate. The products of the invention are oxygen enriched particulate fermentation products of used tire mesh which are integrally bonded to the mycelium produced by the fermentation organism.

The products of this invention have the very useful property of retaining water in sandy soil and permitting the passage of water in clay soil. They are therefore useful as soil conditioners. This property is not shared by the unfermented substrate. If the substrate prior to fermentation is placed in soil and water added the tire mesh will separate from the soil.

An additional and useful property of the products of the invention is their ability to react with metallic ions. It appears likely that oxygen is added to the substrate by oxidative cleavage of carbon-carbon bonds with the formation of carboxyl groups. The carboxyl groups react chemically with metallic ions, for example, in aqueous solution, and bind them. The ions may be released into the soil to serve as vegetative nutrients, or they may be extracted directly from the soil conditioner by the growing plant. Ions which can be bound by the products of this invention include many of the various trace metals generally associated with the proper growth of plants including alkali and alkaline earth metals such as sodium, potassium, calcium, strontium and magnesium; and other metals such as copper, zinc, vanadium, iron and cobalt.

Another interesting utility of the products of this invention is in reseeding barren areas, especially reforesting mountain slopes and other sections which are not easily reached on foot. The conditioners can be mixed with small amounts of soil and seed, suitably packaged in oxygen permeable containers for example in polyethylene bags containing a small amount of moisture and spread from helicopters. A typical mixture may contain from about 5 percent to 25 percent by weight of a product of the invention, 75 percent to 95 percent by weight of soil which is capable of supporting growth and is moistened with water together with at least one seed. Normally, of course relatively large numbers of seed will be included in the bulk mixture as it is formed so that each package unit will contain at least one and preferably several seeds.

This aspect of the invention is especially useful in connection with reforestation with coniferous trees. Every coniferous tree has associated with its root system a specific fungus that is essential for growth of the tree. The fungi are called mycorrhizal fungi, and can be grown in culture. Coniferous seedlings cannot be grown in soils lacking the fungus specific for the species of pine, fir, spruce, etc. It has been discovered that several cultures of mycorrhized fungi grow well on the products of this invention. Thus it is possible to form mud balls containing moist soil, conifer seeds and the fermented products of this invention and package the ball in an oxygen permeable polyethylene, or equivalent bag, which can be hand or mechanically planted in regions where reforestation is required or desirable. The packages can also be distributed from the air.

In one controlled experiment using the products of this invention, red kidney bean seedlings were separately planted in sand, in clay, in sand containing about 10 percent by weight of the fermented product of this invention and in clay similarly extended with a product of the invention. The plants were watered. Growth was observed only in the treated sand and clay.

The increased flow rate of water in clay, and decreased flow rate in sand can be readily demonstrated by mixing the products of the invention with clay and separately with sand. The mixtures are placed in columns fed with water and the flow rate observed. In one experiment it was observed that in a 10 cm column the flow rate of water in sand was 3.8 ml/min, and that this rate was decreased by more than 60 percent when the sand was mixed with 10 percent by weight of the fermented product. The opposite effect, that is an increase in flow rate, was observed when the experiment is carried out with clay.

The following non-limiting example is illustrative of the invention.

Example

A *Fusarium solani* isolate is aerobically grown at about 25° C in a Taber and Vining medium in a 1,000-liter fermenter, equipped with an agitator containing, by weight, 2 percent of 35 mesh tire particles and 0.4 percent ethanol in addition to 0.5 grams per liter of potassium hydrogen phosphate, 0.5 grams per liter of magnesium sulfate and 2.0 grams per liter of ammonium nitrate. Growth is continued un til there is no further appreciable uptake of nitrogen as measured by ammonium ion concentration. At the end of this period the fermentation product is isolated by screening. Microscopic observation reveals the presence of mycelium on the particles which are not affected by exposure to sonic energy or by vigorous treatment in a blender. The mycelium is removed by refluxing for 20 minutes in 6N aqueous hydrochloric acid. The particle size of the fermented particles is about 300 mesh. The oxygen content of the product shows an increase of about 65 percent compared with the starting material as measured by fast neutron activation analysis.

A sample of the mycelium coated product is suspended in a 5 percent aqueous solution of strontium chloride and stirred for 6 hours. At the end of this period the strontium concentration of the solution decreases and the elemental analysis of the fermentation product reveals the presence of strontium.

Another sample of the fermentation product is mixed with sand at a weight ratio of 1:5. The flow rate of water through a 10 cm column of the mixture decreases by over 50 percent.

What is claimed is:

1. A soil conditioner comprising the oxygen enriched particulate fermentation product of rubber tire mesh integrally bonded to the mycelium produced by the fermentation organism in an artificial growth medium.

2. A soil conditioner as in claim 1 wherein the mycelium is produced by a fermentation organism which is a *Fungi imperfecti*.

3. A soil conditioner as in claim 1 wherein the mycelium is produced by an organism selected from the group consisting of: *Fusarium solani, Penicillium ochara, Trichoderma viridae, Penicillium terrestre, Ulocladium botrytis, Ulocladium atrum, Candida utilis* and *Aspergillus flavus var.*

4. A process for increasing the metallic content of a product of claim 1 comprising dispersing the product in an aqueous solution containing a dissolved salt of the metal.

5. A process as in claim 4 wherein the metallic ion is selected from the group consisting of alkali and alkaline earth metals, copper, zinc, vanadium, iron and cobalt.

6. A process which comprises aerobically growing an organism in a liquid fermentation medium containing rubber tire mesh, a source of nitrogen and of trace elements at a temperature of from about 20° C to 35° C and recovering a product which is the fermentation product of the tire mesh integrally bound to the mycelium produced by the fermentation organism.

7. A process as in claim 6 wherein the fermentation organism is a *Fungi imperfecti*.

8. A process as in claim 6 wherein the organism is selected from the group consisting of: *Fusarium solani, Penicillium ochara, Trichoderma viridae, Penicillium terrestre, Ulocladium botrytis, Ulocladium atrum, Candida utilis* and *Aspergillus flavus var. columnaris.*

9. A mixture comprising from about 5 percent to 25 percent by weight, based on the total weight of a soil conditioner which is the oxygen enriched particulate fermentation product of rubber tire mesh integrally bonded to the mycelium produced by the fermentation of said rubber tire mesh with a selected organism in an artificial growth medium, together with from about 95 percent to 75 percent by weight of moist soil and plant seeds.

10. A mixture of claim 9 wherein the seeds are conifer seeds.

11. A mixture of claim 9 in an oxygen permeable package.

12. A mixture of claim 11 wherein the seeds are conifer seeds.

* * * * *